UNITED STATES PATENT OFFICE.

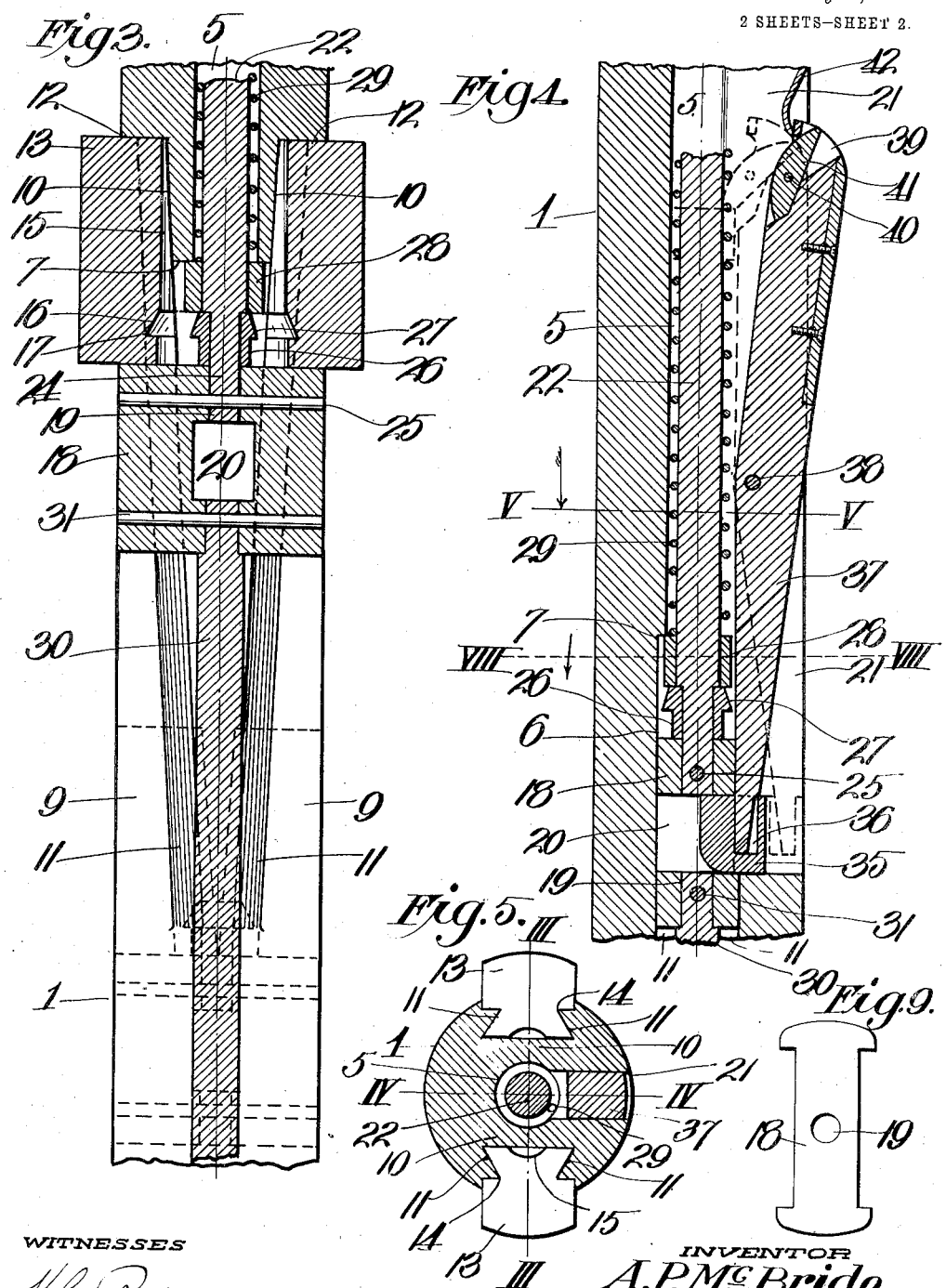

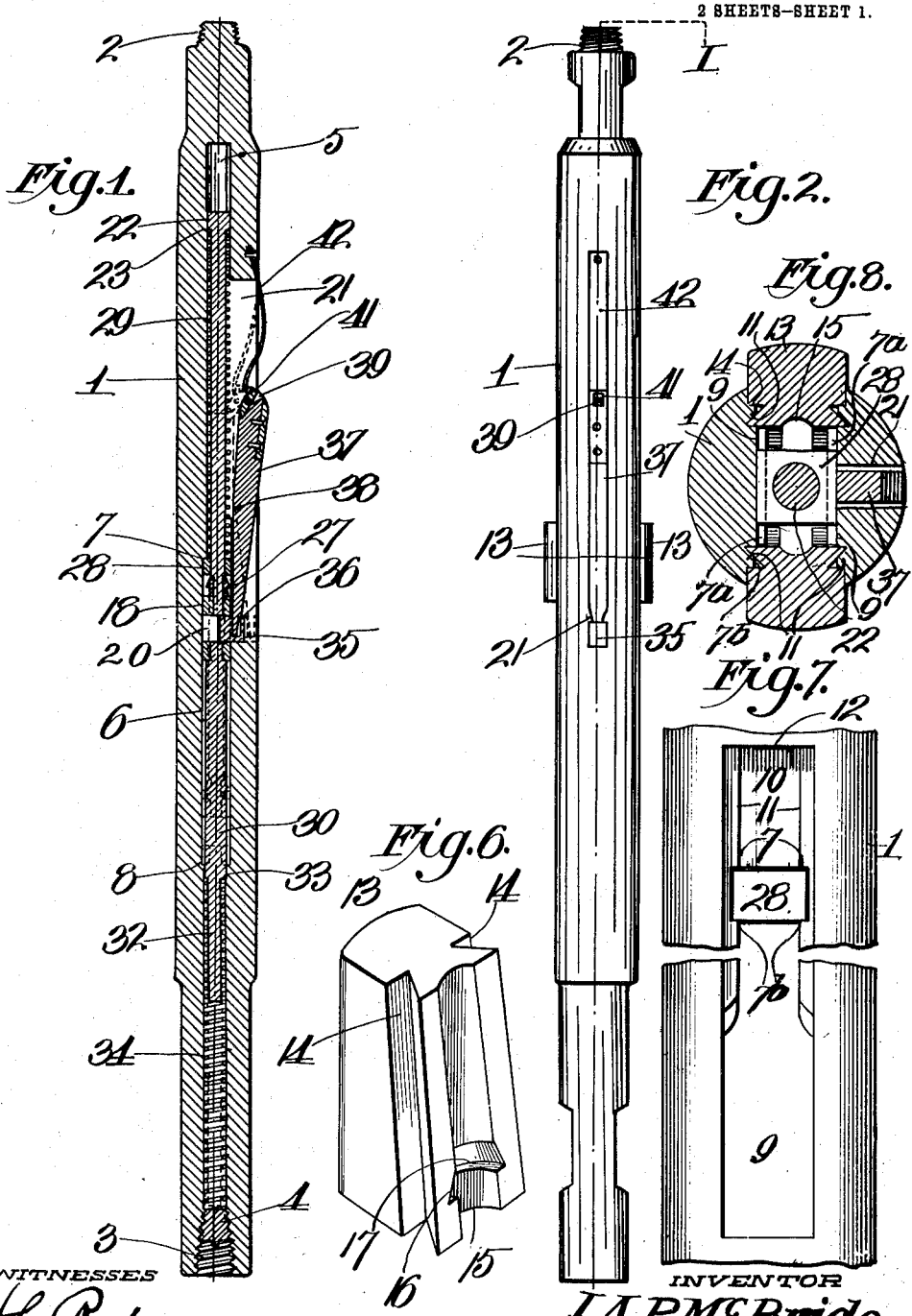
A. P. McBRIDE.
UNDERREAMER.
APPLICATION FILED FEB. 6, 1911.
1,025,413.
Patented May 7, 1912.
2 SHEETS—SHEET 1.

ALBERT P. McBRIDE, OF INDEPENDENCE, KANSAS.

UNDERREAMER.

1,025,413.  Specification of Letters Patent.  Patented May 7, 1912.

Application filed February 6, 1911. Serial No. 606,958.

*To all whom it may concern:*

Be it known that I, ALBERT P. McBRIDE, a citizen of the United States, residing at Independence, in the county of Montgomery and State of Kansas, have invented certain new and useful Improvements in Underreamers, of which the following is a specification.

This invention relates to under reamers of that class for enlarging holes below well-casings to permit such casings to be set deeper into the ground, and has for its object to produce a tool of the character specified which will operate efficiently and reliably and embodies the desirable features of simplicity, strength and durability.

With this object in view the invention consists in certain novel and peculiar features of construction and combinations of parts as hereinafter described and claimed; and in order that it may be fully understood reference is to be had to the accompanying drawings, in which—

Figure 1, is a central vertical section of an under reamer embodying my invention, on the line I—I of Fig. 2, is a side elevation of the same. Fig. 3, is an enlarged central vertical section on the line III—III of Fig. 5. Fig. 4, is a sectional view on the same scale as Fig. 3, and in the same plane as Fig. 1. Fig. 5, is a horizontal section on the line V—V of Fig. 4. Fig. 6, is a detail perspective view of one of the reaming or cutting bits. Fig. 7, is a side view of a part of the tool, broken away, on the same scale as Figs. 3 and 4, with certain parts omitted. Fig. 8, is a section on the line VIII—VIII of Fig. 4, and Fig. 9, is a plan view of the cross-head.

In the said drawings, 1 indicates a rod provided with a threaded stem 2 at its upper end to which an extension not shown, is adapted to be detachably secured and with a threaded socket 3 at its lower end to receive a bit not shown, for boring in advance of the rod, the removable plug 4, closing the lower end of the tubular passage 5, extending for a large part of the length of the rod, said passage being of increased diameter between its ends as at 6 to provide a downwardly disposed shoulder 7, and an upwardly disposed shoulder 8.

9 indicates a pair of opposite slots formed in the tool and communicating with the enlarged portion 6 of passage 5, the upper ends of said slots being of diminished size, radially measured to leave between them portions 10, depending below shoulders 12, and projecting from opposite walls of said slots are downwardly converging ribs 11, extending from shoulders 12 to within a suitable distance of the lower ends of slots 9, the said ribs being tapered at their lower ends as shown in Fig. 7. Between the ribs the slots 9 are narrowed so that their walls between the ribs and forming the opposite sides of the enlarged portion 6 of the passage 5 shall be approximately as near together as the adjacent edges of opposite ribs as shown in Figs. 7 and 8, for a purpose which hereinafter appears.

13 indicates oppositely disposed bits or cutters to fit slidingly in slots 9 and of such width, radially measured, that they project beyond the circumference of the rod when in elevated or operative position as shown in Fig. 3, and lie within the circumference of said rod when slid downward to the lower ends of said slots. The bits or cutters are dove-tailed at their inner sides at an angle corresponding to the ribs 11 so as to form grooves 14 receiving said ribs, in order that in moving downwardly or upwardly they shall incidentally move inward or outward respectively. In their inner faces the bits or cutters are provided with grooves 15 and near the lower ends the said grooves are formed with recesses which taper upwardly and inwardly to the bases of said grooves leaving upwardly disposed shoulders 17 forming the lower ends of said recesses.

18 is a slidable cross-head fitting in the slots 9 below the bits or cutters and provided centrally with a vertical perforation 19 enlarged at 20, and for communication with the lower end of the slot 21 formed in the rod at right angles to slots 9 and extending upwardly a considerable distance beyond the upper end of said slots.

22 is a rod fitting slidingly in the upper part of passage 5 and diametrically enlarged at its upper end to form a downwardly disposed shoulder 23, the lower end of said rod being diametrically reduced and fitting in the upper end of the cross-head and secured therein by a cross pin 25, as shown most clearly in Figs. 3 and 4.

26 is an arrow-headed tube fitting on the reduced lower end of rod 22 and extending from the cross-head to the upper end of the reduced portion 24, as shown in Figs. 3 and 4, the head or enlargement of said tube being numbered 27, and of form to be snugly received at opposite sides by the recesses of the bits or cutters.

28 is a nut or collar slidingly receiving rod 22 and bearing at its upper side against the downwardly disposed shoulders 7, and resting upon the upwardly disposed shoulder 7ª formed by recessing the walls of the slots 9 between the ribs 11. The ribs are cut away opposite said recesses at 7ᵇ, to permit the collar to be slipped between shoulders 7 and 7ª.

29 is a coiled spring surrounding rod 22 within passage 5 and bearing at its opposite ends against the shoulder 23 of said rod and the nut or collar 28, this spring tending to hold the rod elevated.

30 is a second rod for reciprocatory action in the lower end and enlarged intermediate portion 6 of said passage, the upper end of said rod being reduced and fitting in the lower part of the cross-head and secured therein by a pin 31. The lower end of said rod is diametrically reduced as at 32 to form a downwardly-disposed shoulder 33, and surrounding the reduced portion 32 of said rod within the lower end of passage 5 and bearing at its upper end against shoulder 33 and at its lower end on plug 4, is a coiled spring 34 tending to coöperate with spring 29 in holding the rod, the cross head, the arrow-headed tube and the bits or cutters 13 in their elevated positions. To lock said parts in such elevated position, a slide bolt 35 is provided for insertion in the opening 20 of the cross head. The bolt is provided with a socket 36, loosely receiving the lower end of a lever 37 arranged in slot 21 and pivoted to the rod at 38. At its upper end the lever is provided with an opening 39 and pivoted to said end of the lever at 40 is a dog 41, whose upper end is susceptible of movement in opening 39, and engaging the upper end of the lever and tending to press the same outwardly and the bolt 35 into opening 20 of the cross head, is a spring 42, secured at its upper end to the tool.

In boring oil and gas wells veins of water are frequently encountered at varying depths as well as strata which frequently cave or fall in. Hence it is necessary to insert casings in the holes consisting of a sufficient number of pipes coupled endwise together to reach to and rest on the bottom of the hole. A drill is then inserted through the casing to increase the depth of the hole in an endeavor to find gas or oil, and very often such tool encounters other veins and strata which render it impossible to go deeper without lengthening and lowering the casing until the same is below such veins or strata. As it is impracticable to pull the casing out of the hole because the latter would be quickly closed by caving material, it is necessary to resort to what are known as under reamers to increase the diameters of the holes below the casings sufficiently to permit the latter to be let down the desired distance. Assuming this condition of affairs and that it is desired to enlarge a hole below the casing, the latter is raised a few feet. Assuming the parts of the under reamer to be arranged as shown, the operator first rocks the lever to the position shown in dotted lines Fig. 4 to withdraw the bolt from engagement with the cross head, and then applies pressure upon the projecting bits or cutters and slides the same downward until they lie wholly within the circumference of the rod, as hereinbefore mentioned, the cross head and rods of course moving downward with the bits or cutters and the springs 29 and 34 being compressed. As this downward movement ends, the dog or catch 41 is swung to a position over the upper end of rod 22 so that the upward pressure of the springs shall cause the opposite end of the catch to bear upon the upper end of the lever, which being held against outward movement at its upper end prevents upward movement of the rods, it being noticed in this connection, that as such downward movement ends, the head of the tube 27 is received by the recesses of the bits or cutters so that shoulders 17 underlie the head of the tube and are locked from independent upward movement. While holding the parts as explained the tool is inserted in the upper end of the casing and is of such diameter that the latter prevents upward or outward movement of the bits or cutters or outward movement of the lever. The tool is lowered until first the bits and then the upper end of the lever clear the lower end of the casing. If the boring continued below such point, the tool is lowered into the same until its downward movement is arrested by the engagement of the lower ends of the bits or cutters with the ground at the point where the casing originally rested. If the boring did not continue downward as explained, then the bit at the lower end of the tool is caused to continue the boring until the bits or cutters engage the ground at the point where the lower end of the casing originally rested. The continued downward movement of the tool now results in producing a relatively upward movement of the bits or cutters until such movement is arrested by shoulders 12, it being noted that as the bits or cutters of the cross head, rods and headed tube move upward under the action of springs 29 and 34, the bits or cutters are withdrawn from engagement with the headed tube, and that as they attain their upward limit of adjustment the spring 42 rocks the lever and causes the same to force the bolt into the opening of the cross head and thus lock the parts in the position shown in Fig. 3. The boring action is then continued to cause the bits or cutters to ream out or enlarge the hole to the desired depth. The tool is then pulled upward and in such movement the lever through the contact of its curved upper end with the lower end of the casing is rocked inward to withdraw the bolt from engagement with the cross head, the casing holding it in such position until the upper ends of the bits or cutters strike the lower ends of the casing and are relatively forced downward until they again lie within the plane of the circumference of the rod so that the tool may be drawn upward through the casing, the latter being then lowered until it rests upon the bottom of the reamed out portion, as will be readily understood.

From the above description it will be apparent that I have produced an under reamer embodying the features of advantage enumerated as desirable in the statement of invention and which is of inexpensive construction and susceptible of quick and easy repair in the event of injury to any of its parts.

I wish it to be understood that while I have illustrated and described the preferred embodiment of the invention I do not desire to be restricted to the exact details of construction and organization shown and described as obvious modifications will suggest themselves to one skilled in the art.

I claim:—

1. An underreamer, comprising a rod, having a longitudinal passage and downwardly-disposed shoulders and a longitudinal slot communicating with said passage, a cross-head slidable in said passage, spring-actuated means tending to force the cross head upward, one or more bits or cutters slidable obliquely on the rod and adapted to be clamped by the cross head against said downwardly-disposed shoulders, a bolt, a spring-actuated lever fitting in said slot and loosely engaging the bolt to hold the same interlocked with the cross head, and adapted above its pivotal point to normally project out of said slot beyond the circumferential plane of said rod, and connections whereby said lever when lying wholly within said slot may prevent upward movement of the cross-head.

2. An under reamer, comprising a rod having a longitudinal passage and downwardly disposed shoulders, a cross-head slidable in said passage, spring-actuated means tending to force the cross-head upward, a device above and movable with the cross head provided with a downwardly disposed shoulder, and bits or cutters slidable obliquely on the rod and adapted to be clamped by the cross head against the said downwardly disposed shoulders of the rod, and provided in their inner faces with recesses to receive the shouldered part of said device and be locked thereby from working or sliding upwardly after having been depressed or slid downward.

3. An under reamer, comprising a rod having a longitudinal passage and downwardly disposed shoulders, a crosshead slidable in said passage, spring-actuated means tending to force the cross head upward, a device above and movable with the cross head provided with a downwardly disposed shoulder, bits or cutters slidable obliquely on the rod and adapted to be clamped by the cross-head against the said downwardly disposed shoulders of the rod and provided in their inner faces with recesses to receive the shouldered part of said device and be locked thereby from working or sliding upward after having been depressed or slid downward, and means for holding the cross-head in its depressed or lowered position.

4. An under reamer, comprising a rod having a longitudinal passage and downwardly disposed shoulders, a cross-head slidable in said passage, spring-actuated means tending to force the cross-head upward, a device above and movable with the cross-head provided with a downwardly-disposed shoulder, bits or cutters slidable obliquely on the rod and adapted to be clamped by the cross-head against the said downwardly-disposed shoulders of the rod and provided in their inner faces with recesses to receive the shouldered part of said device and be locked thereby from working or sliding upward after having been depressed or slid downward, means for holding the cross head in its depressed or lowered position, and yielding means for automatically tripping said holding means to permit the cross head, the shouldered device and the bits or cutters to be reëlevated.

5. An underreamer comprising a rod having opposite longitudinal slots, a crosshead slidable on said rod and engaging said slots, a bit or cutter in each slot and bearing a dove-tail relation to the rod and adapted to move obliquely downward and inwardly to lie wholly within the plane of the circumference or upwardly and outwardly to project beyond the plane of the circumference of the said rod, means movable with the cross-head for interlocking with the bits or cutters and disposed to hold them against accidental upward movement, and means to lock the cross-head and the bits or cutters in their elevated position.

6. An underreamer, comprising a rod having opposite longitudinal slots, a crosshead slidable on said rod and engaging said slots, a bit or cutter in each slot and bearing a dove-tail relation to the rod and adapted to move obliquely downward and inwardly to lie wholly within the plane of the circumference or upwardly and outwardly to project beyond the plane of the circumference of the said rod, means movable with the cross-head for interlocking with the bits or cutters and disposed to hold them against accidental upward movement, a bolt movable radially of the rod, and a spring-actuated lever to cause said bolt to interlock with the cross-head when the same and the bits or cutters are elevated.

7. An under reamer, comprising a rod having a longitudinal passage and opposite longitudinal slots extending from its circumference to and communicating with said passage, a cross head slidable vertically in said slots, a rod arranged in said passage and connected to said cross-head, a bit or cutter in each slot and bearing a dove-tailed relation to the first-named rod so as to slide downwardly and inwardly to lie wholly within the plane of the circumference, or upwardly and outwardly to project beyond the plane of the circumference of the said rod, means movable with the cross-head for interlocking with the bits or cutters when depressed to hold them against accidental upward movement, and means to lock the cross head and the bits or cutters in their elevated position.

8. An under reamer comprising a rod having a longitudinal passage and opposite longitudinal slots extending from its circumference to and communicating with said passage, a cross-head slidable vertically in said slots, a rod in said passage and attached to said cross-head, a bit or cutter in each slot and bearing a dove-tailed relation to the first-named rod so as to slide downwardly and inwardly to lie wholly within the plane of the circumference, or upwardly and outwardly to project beyond the plane of the circumference of the said rod, means movable with the cross-head for interlocking with the bits or cutters when depressed to hold them against accidental upward movement, a bolt movable radially of the said first-named rod, and a spring-actuated lever to cause said bolt to interlock with the cross head when the latter and the bits or cutters are elevated.

9. An under reamer, comprising a rod having a longitudinal passage and opposite longitudinal slots extending from its circumference to and communicating with said passage, a cross head slidable vertically in said slots, rods in said passage above and below and attached to said cross-head, a bit or cutter in each slot and bearing a dove-tailed relation to the first-named rod so as to slide downwardly and inwardly to lie wholly within the plane of the circumference, or upwardly and outwardly to project beyond the plane of the circumference of the said rod, means movable with the cross-head for interlocking with the bits or cutters when depressed to hold them against accidental upward movement, a bolt movable radially of the said first-named rod, a spring-actuated lever to cause said bolt to interlock with the cross-head when the latter and the bits or cutters are elevated, and a dog pivotally carried by said lever and adapted when the cross head and the rods are depressed and the lever lies wholly within the plane of the circumference of the rod to overlie the rod above the cross-head and prevent upward movement of the latter and the bits or cutters.

10. An under reamer comprising a rod, provided with a central longitudinal passage, a pair of longitudinal slots communicating with said passage and extending to the circumference of the rod, the walls at each side of the slot having a pair of upwardly diverging ribs, and a longitudinal slot arranged at right angles to the first-named slots and extending from a point near the upper ends of the latter to a point a considerable distance above said upper ends, a cross-head slidable in the first-named slots and provided with an opening, a rod above and attached to the cross-head and a rod below and attached thereto, a nut or collar slidably receiving the upper rod and held against vertical movement, a spring surrounding the upper rod and bearing at its upper end against the same and at its lower end against said nut or collar, and tending to hold the rods and cross-head elevated, a spring surrounding the other rod and exerting upward pressure on the same, a plug closing the lower end of the passage and receiving the downward thrusts of the last-named spring, an arrow-headed tube mounted on the upper rod between said nut or collar, and the cross-head, a bit or cutter projecting into each of said first-named slots and provided with inclined grooves receiving said ribs and with recesses for the reception when nearly depressed of the head of said tube, a lever pivoted in the third slot of the rod, a bolt adapted to be moved by said lever from a position wholly within said slot into the opening of the cross-head, a spring carried by the rod engaging the lever to project the bolt into the cross-head, and a pivoted dog carried by the lever and adapted when the cross head is depressed and the lever is swung wholly within the plane of the circumference of the rod to be caused to overlap the upper rod and lock the bits or cutters in their depressed positions.

In testimony whereof I affix my signature, in the presence of two witnesses.

ALBERT P. McBRIDE.

Witnesses:
JESSE P. McBRIDE,
THOMAS F. MACDONALD.